April 16, 1946. J. M. BELL 2,398,574
DRAG TESTING APPARATUS
Filed Feb. 23, 1945 8 Sheets-Sheet 4

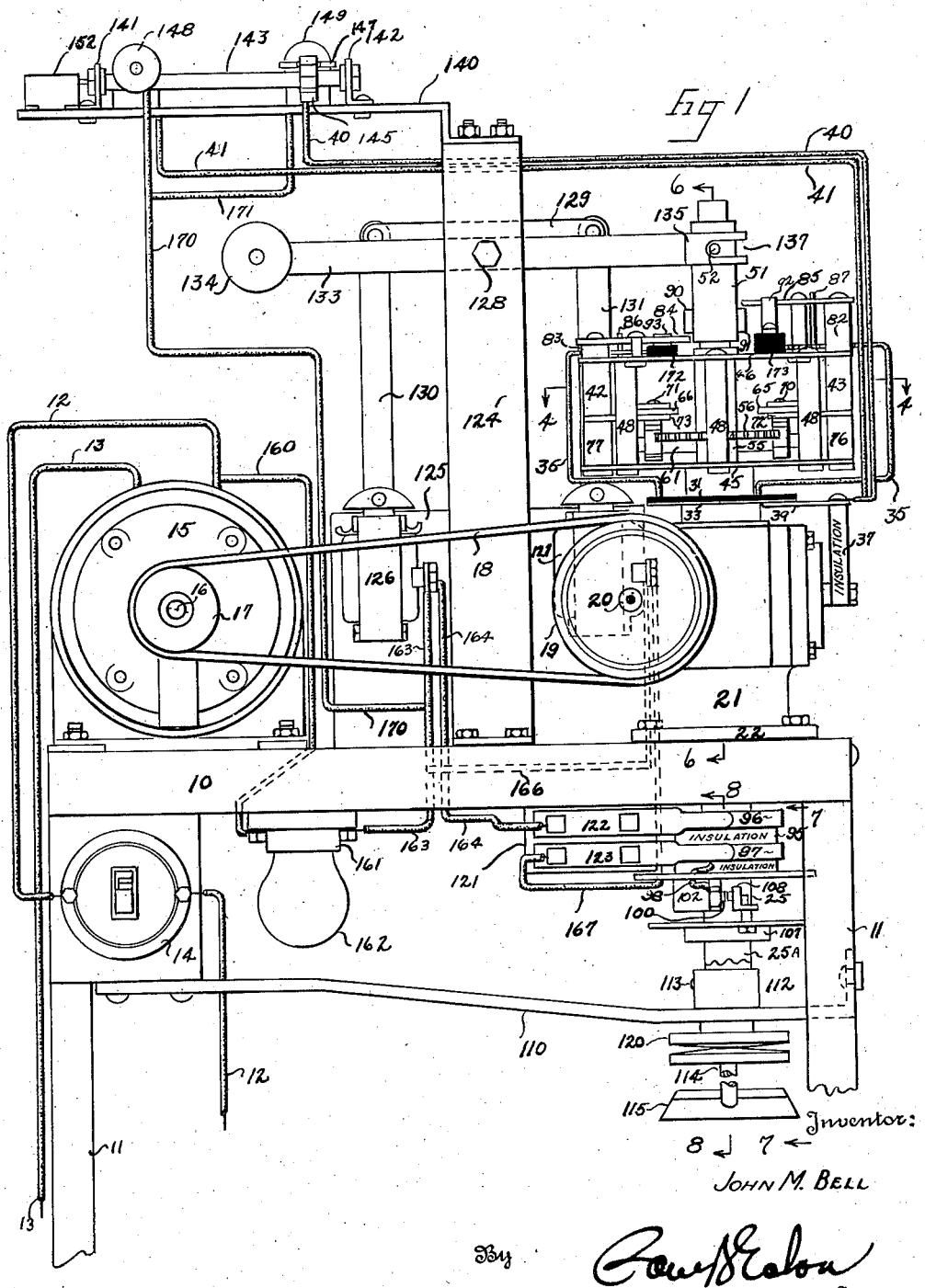

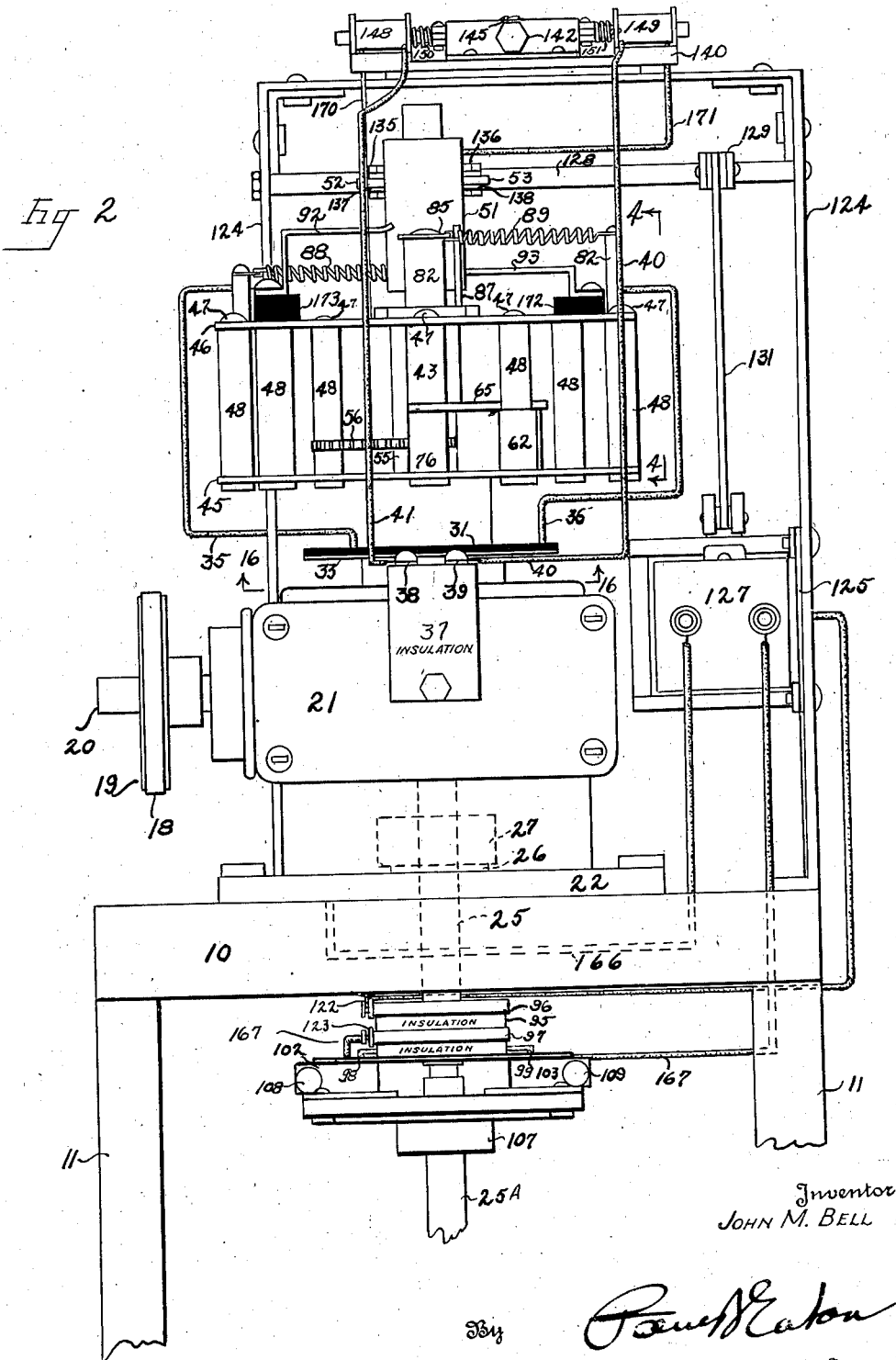

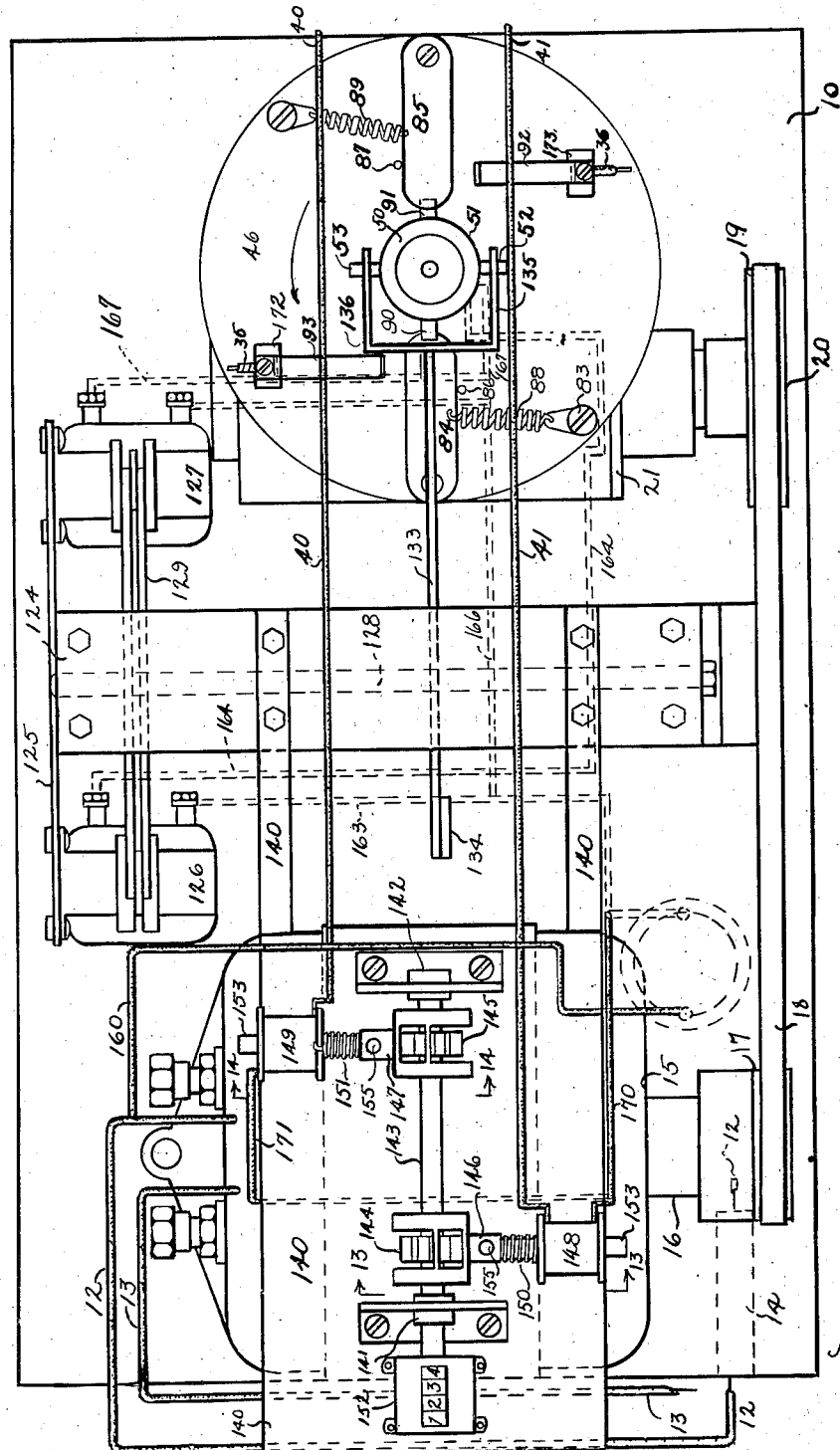

Inventor:
JOHN M. BELL
By
Attorney

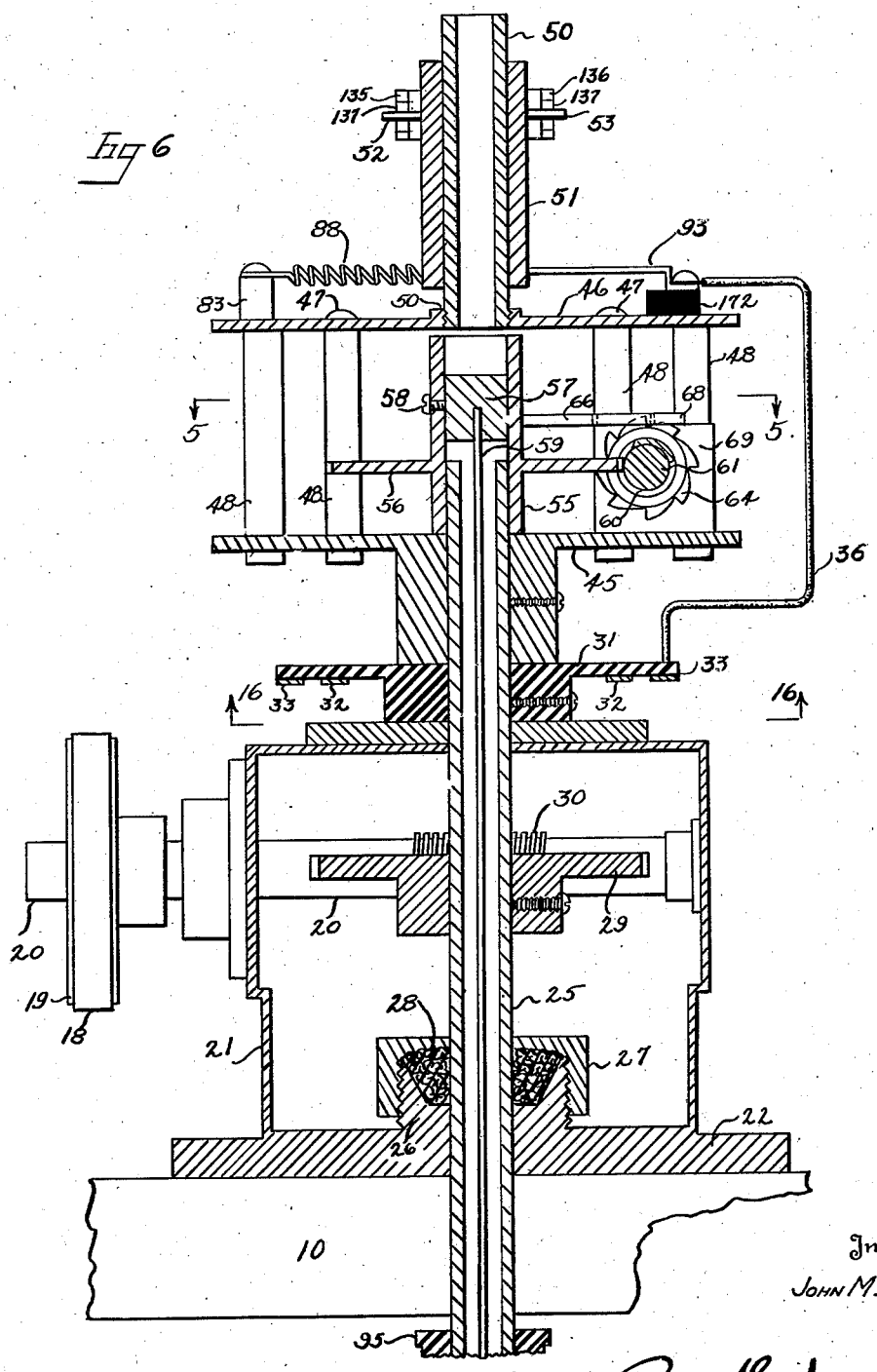

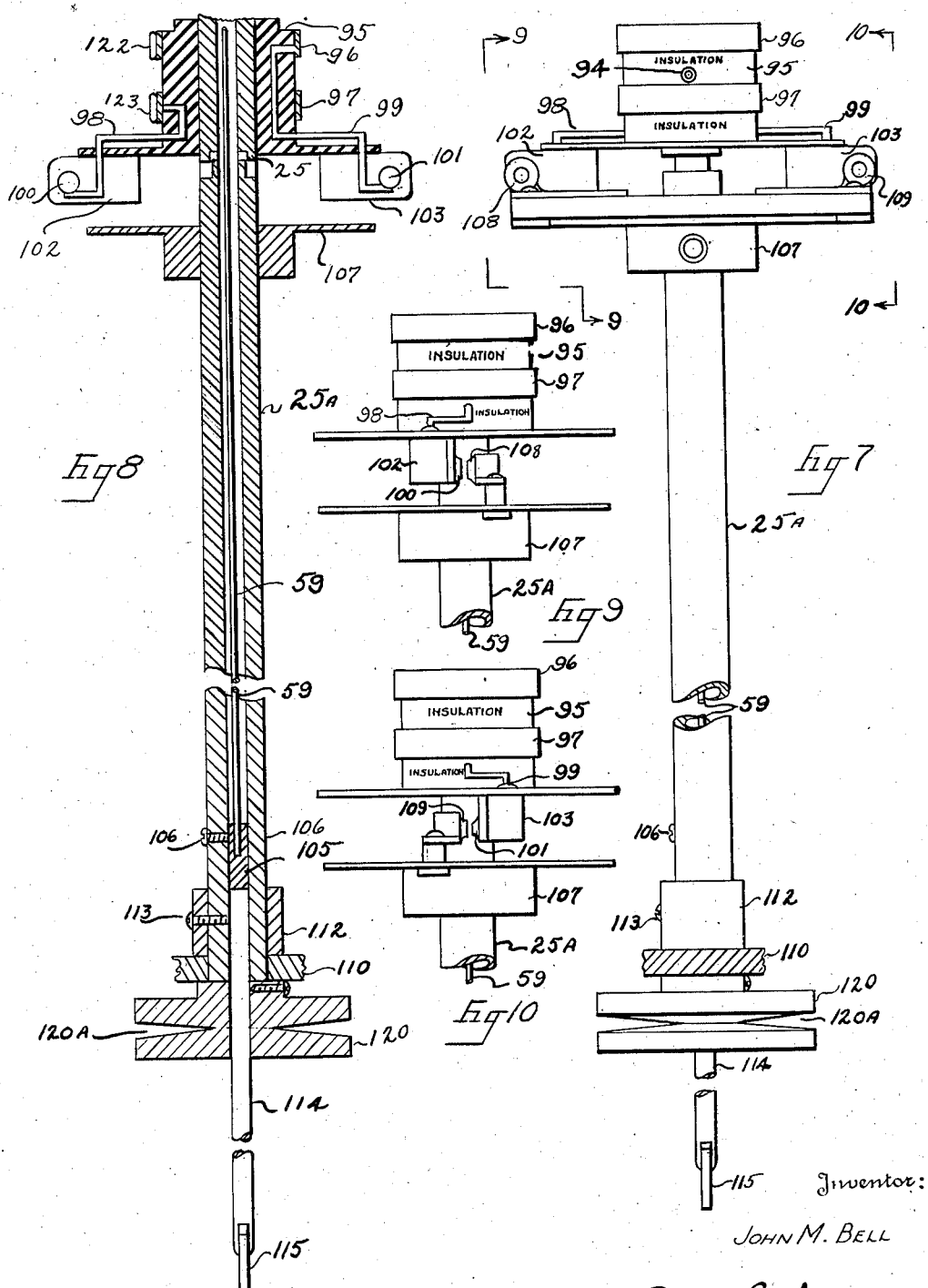

Inventor:
John M. Bell
By Paul N. Eaton
Attorney

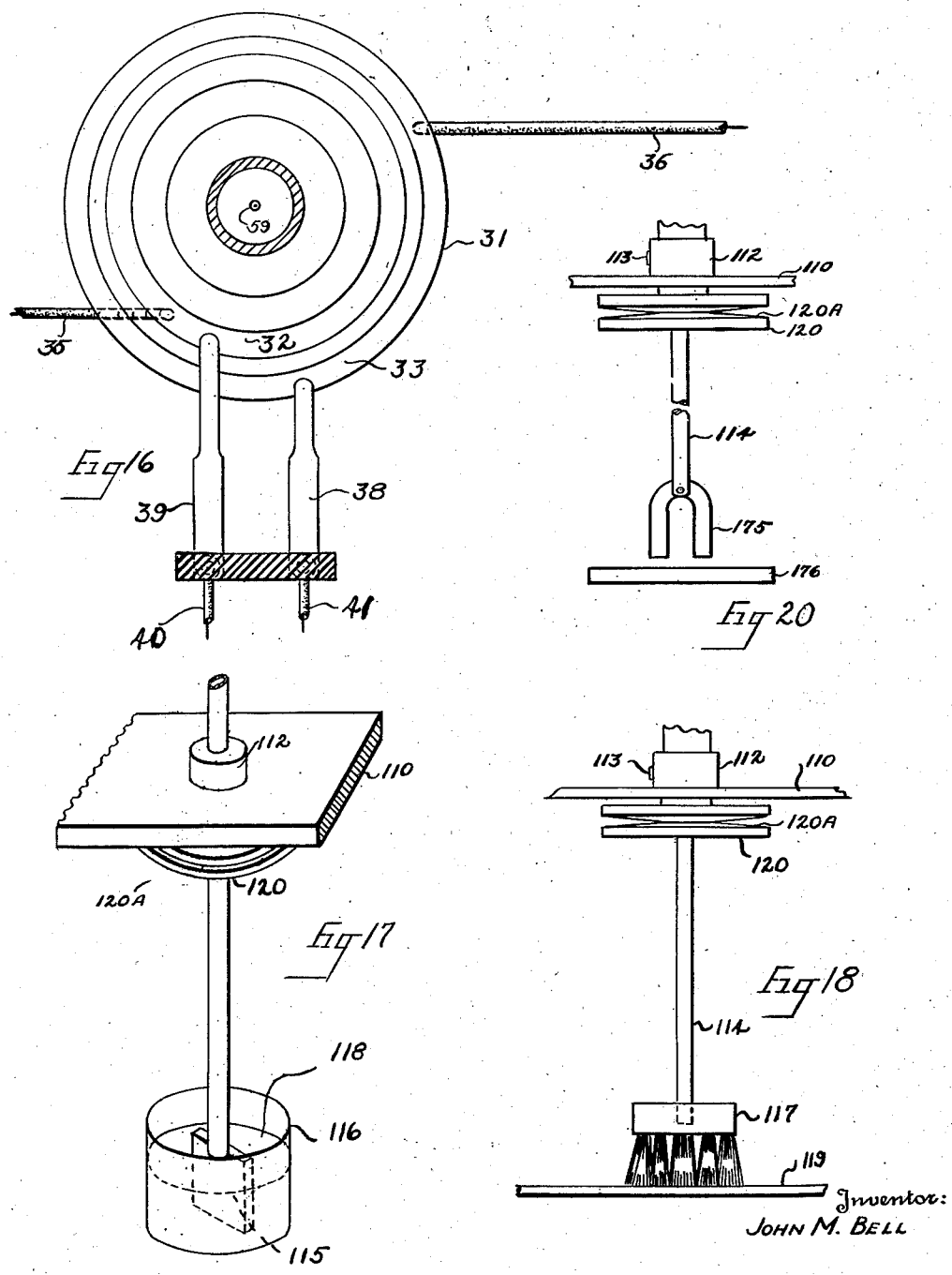

Patented Apr. 16, 1946

2,398,574

UNITED STATES PATENT OFFICE 2,398,574

DRAG TESTING APPARATUS

John M. Bell, Chester, S. C.

Application February 23, 1945, Serial No. 579,401

17 Claims. (Cl. 73—59)

This invention relates to an apparatus for constantly determining the viscosity in a fluid and indicating as to whether the viscosity is increasing or decreasing, together with means for varying the amount of pressure applied to the means submerged in the liquid for varying the amount of torsion or driving effect on the means for driving the member disposed within the fluid which is being tested.

It is an object of this invention to provide testing means for constantly testing and indicating the smoothness of a surface which is being tested.

It is another object of this invention to provide apparatus for continuously and constantly testing viscosity, smoothness of surface and the like, and indicating any changes which may occur therein with compensating means for varying the driving effect of the apparatus on the testing tool in accordance with changes in viscosity, smoothness of surface and the like.

It is another object of this invention to provide means for continuously testing the magnetic characteristics of a metal.

Some of the objects of the invention having been stated, other objects will appear as the description proceeds when taken in connection with the accompanying drawings in which—

Figure 1 is a side elevation of the apparatus;

Figure 2 is a front elevation of the apparatus looking from the left hand side of Figure 1;

Figure 3 is a top plan view of the apparatus;

Figure 6 is a vertical sectional view taken along the line 6—6 in Figure 1;

Figure 7 is an elevation taken partly in section and along the line 7—7 in Figure 1;

Figure 8 is a vertical sectional view on an enlarged scale and taken along the line 8—8 in Figure 1;

Figure 9 is an elevational view looking from along the line 9—9 in Figure 7;

Figure 10 is an elevational view looking from along the line 10—10 in Figure 7;

Figure 16 is a view looking upward along the line 16—16 in Figures 2 and 6;

Figure 17 is an isometric view showing the lower end of the apparatus with the paddle disposed in a container having a liquid therein;

Figure 18 is a view of the lower end of the apparatus showing a brush 117 in contact with the surface of a member 119 being tested;

Figure 20 shows another form of testing tool.

Figures 4, 5:
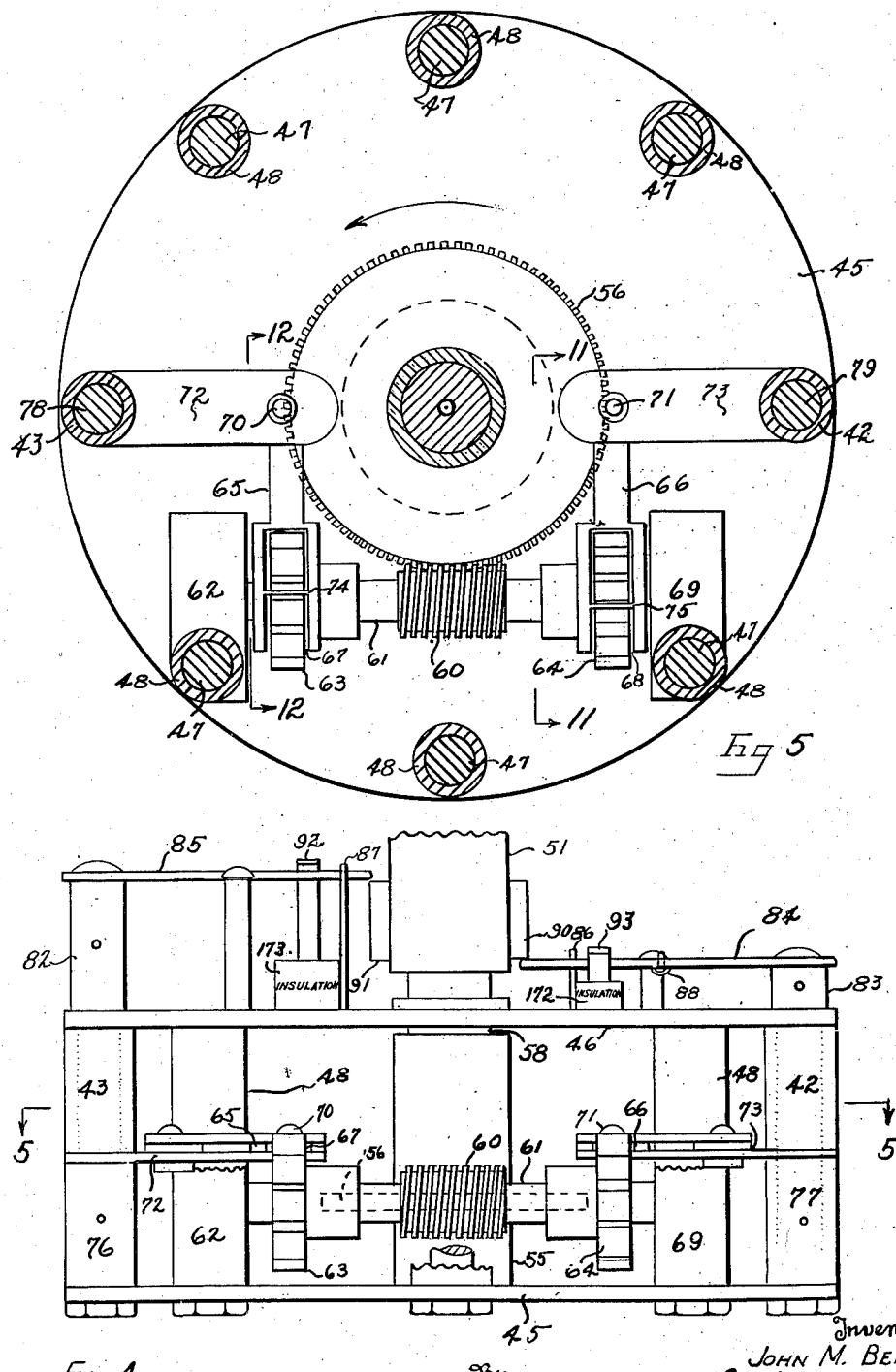
Figure 4 is an elevational view looking from along the line 4—4 in Figure 2.
Figure 5 is a horizontal sectional view taken along the line 5—5 in Figures 4 and 6.
Figure 15:
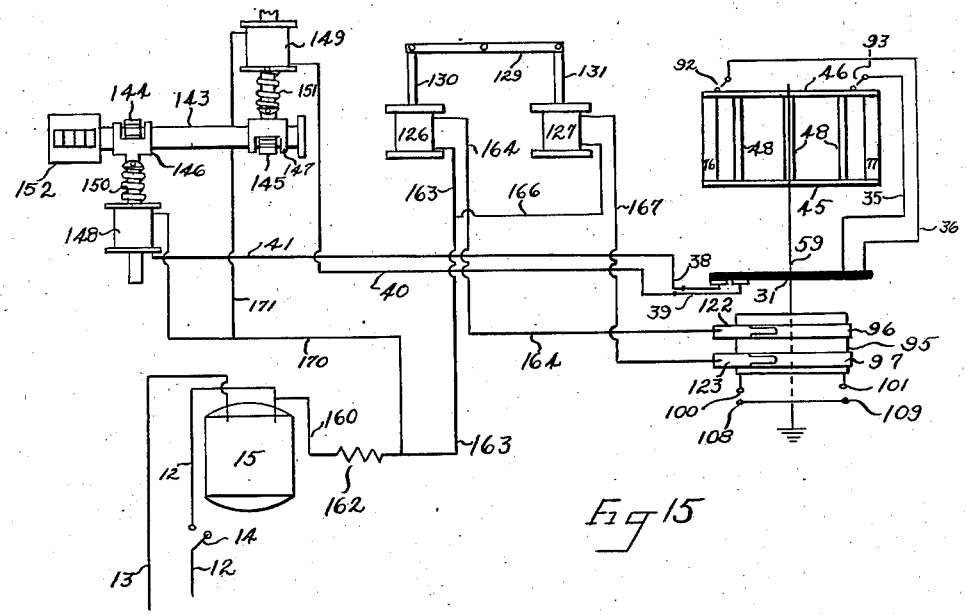
Figure 15 is a wiring diagram of the apparatus.

Referring more specifically to the drawings, the numeral 10 indicates a base framework having suitable legs 11 extending downwardly therefrom to the floor, not shown, for supporting the apparatus above the floor so that the testing device on the lower end of the testing apparatus may be positioned a substantial distance above the floor.

A pair of electric wires 12 and 13 are connected to any suitable source of electric current and wire 12 has a switch 14 therein. These wires lead to an electric motor 15 which is mounted on the frame 10. This motor has a motor shaft 16 on which a pulley 17 is mounted, the pulley 17 having a belt 18 mounted thereon, which is also mounted on a pulley 19 on a worm shaft 20 mounted in a suitable housing 21.

The housing 21 has a base portion 22 integral therewith which rests on the framework 10. Rotatably mounted in the housing 21 is a vertically disposed tube 25, which is surrounded by a suitable packing box 26 integral with the upper surface of the base portion 22 of the housing and threadably secured on this projection 26 is a cap 27 and suitable packing material 28 is disposed between cap 27 and packing box 26 for preventing leakage of oil and other fluid which might be disposed within the housing 21. This permits rotation of the tube 25 in the packing box.

Fixedly secured on the tube 25 is a worm wheel 29 which meshes with a worm 30 on shaft 20. Rotation of shaft 20 when the motor 15 is operating will impart rotation to the tube 25. The tube 25 projects upwardly through the top of the housing 21 and has fixedly secured thereon an insulation disk 31 having a pair of annular metallic bands 32 and 33 mounted on the lower surface thereof.

A suitable conductor wire 36 is connected to the outer annular metallic band 33 and a conductor wire 35 is connected to the inner metallic band 32, which wires at their other ends are connected in a manner to be later described.

Mounted on one side of the housing 21 is an insulation block 37 which has a pair of metallic brushes 38 and 39 mounted thereon, the brush 38 contacting the outer metallic band 33 and the brush 39 contacting the inner metallic band 32. A wire 41 leads from brush 38 to a counting mechanism to be presently described, while the wire 40 is connected to the brush 39 and leads to a connection to be later described.

The tube 25 has fixedly secured thereon a circular plate 45 forming the lower part of what I term a revolving cage. There is also an upper circular plate 46. Plate 46 which forms a part of the cage is mounted on a plurality of uprising posts 47 and spacers 48 surround these posts and are disposed between the lower plate 45 and the upper plate 46 for supporting the plate 46. The plate 46 is threadably secured on a tube 50 which projects upwardly a substantial distance. This tube 50 has mounted thereon for vertical sliding movement, a tube 51 having a pair of pins 52 and 53 projecting laterally therefrom which are adapted to be engaged by a swinging member associated with certain solenoids which will be presently described.

The tube 25 projects upwardly a substantial distance above the upper surface of lower plate 45 and has rotatably mounted thereon a tubular member 55 which has a worm wheel 56 integral therewith. This sleeve or tubular member 55 has secured therein a plug 57 by means of a set screw 58. In the lower end of plug 57 is fixedly secured by soldering, welding or the like, a torsion wire 59. The worm gear 56 meshes with a suitable worm 60 on a shaft 61, which is rotatably mounted in bearings 62 and 69 mounted on the upper surface of lower cage plate 45. This shaft 61 has fixedly secured thereon ratchet wheels 63 and 64, the upper portions of which are engaged by operating members 65 and 66.

Figures 11, 14:
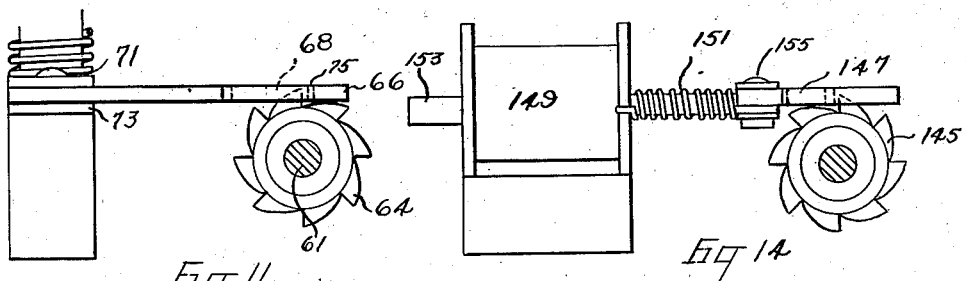
Figure 11 is a sectional view taken along the line 11—11 in Figure 5.
Figure 14 is a sectional view taken along the line 14—14 in Figure 3.
Figures 12, 13:
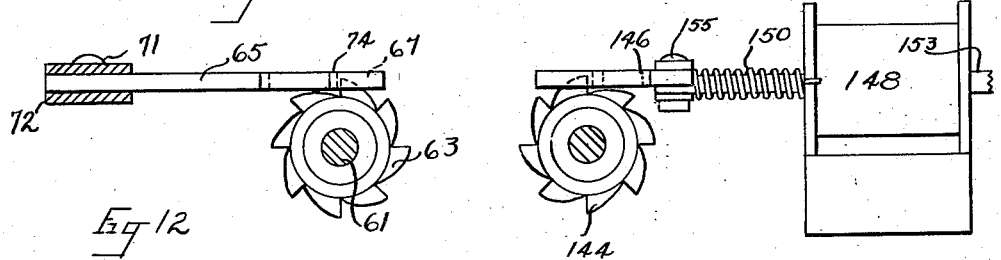
Figure 12 is a sectional view taken along the line 12—12 in Figure 5.
Figure 13 is a sectional view taken along the line 13—13 in Figure 3.

It will be observed, especially in Figures 11 and 12, that these ratchet wheels are opposite hand and are adapted to rotate the shaft 61 in opposite directions. The operating member 65 has an open ended slot 67 in its free end, and a cross bar 74 of this slot is adapted to engage against a tooth in the ratchet wheel and rotate the shaft 61 one notch when the operating member 65 is moved toward the observer in Figure 5 or to the right in Figure 12.

The operating member 66 also has a slot 68 having a cross bar 75 and when it is moved to the left in Figure 11 or away from the observer in Figure 5, it will rotate the shaft 61 one notch in an opposite direction to that which the first ratchet wheel 63 is adapted to rotate the shaft 61.

The other ends of the operating members 65 and 66 are pivotally connected as at 70 and 71 to the free ends of levers 72 and 73 which are fixedly secured on oscillating shafts 78 and 79. The levers 72 and 73 have downwardly projecting tubular portions 76 and 77 which are fixedly secured to vertically disposed shafts 78 and 79.

The shafts 78 and 79 are turnably mounted in the upper and lower cage plates 46 and 45 respectively and project upwardly a substantial distance and have the tubular portions 82 and 83 of levers 84 and 85 fixedly secured thereto.

Between the cage plate 46 and the levers 72 and 73 there are spacer members 42 and 43 disposed on shafts 78 and 79.

The levers 84 and 85 are normally held against stops 86 and 87 by means of tension springs 88 and 89 (Fig. 8) whose other ends are secured to the top surface of upper cage plate 46.

The sleeve 51 has a pair of projections 90 and 91 integral therewith and which are adapted to be engaged by the free ends of levers 84 and 85 except when the sleeve 51 is in neutral position as shown in Figure 4.

When the sleeve 51 is in lowered position, and the tube 25 and the cage, including plates 45 and 46 are rotating in a counterclockwise direction in Figure 3, the projections 90 and 91 will be engaged by the lever 84 and the lever 84 will be swung on its pivot twice during each revolution of the cage. This will cause the lever to momentarily engage a metallic leaf spring 93 and complete a circuit to be presently described and when the lever has passed by each projection it will be drawn back to normal position by means of its spring 88.

When the sleeve 51 is in raised position it will cause the projections 90 and 91 to be engaged by the lever 85 and swing the lever 85 into contact with a leaf spring contact member 92 to complete a circuit to be described.

The tube 25, after passing out of the lower end of the housing 21, has fixedly secured thereon by means of a set screw 94, an insulation block 95 which has metallic bands 96 and 97 secured therearound to which are secured wires 99 and 98 respectively, which lead to contact points 101 and 100 respectively mounted on blocks 103 and 102 respectively.

Disposed immediately below the pipe 25 is a similar pipe 25A (Fig. 8) through which the torsion wire 59 extends and the lower end of the torsion wire is fixedly secured in a block 105, which is fixed in tube 25A by means of a set screw 106.

Fixedly mounted on the tube 25A is a metallic circular member 107 which has mounted thereon and in electric communication therewith a pair of contact points 108 and 109. The framework includes a substantially horizontal support 110, in which the lower end of tube 25A is rotatably mounted.

The tube 25A is supported for rotation on support 110 by means of a collar 112, being fixedly secured thereon by means of a set screw 113 passing through collar 112 and tube 25A. Set screw 113 also secures a rod 114 in position and this rod has a suitable paddle 115 on the lower end thereof, which is adapted to be placed in a fluid for testing the fluidity or the viscosity thereof.

In Figure 17 I show a suitable container 116 in which the paddle 115 may operate with the paddle being shown in somewhat different shape in Figure 17, but the shape of the paddle is not important. The fluid line in container 116 is indicated by reference character 118.

Immediately below the support 110 there is adapted to be secured on rod 114 a grooved wheel 120 having a V-shaped groove 120A in its periphery so that instead of having the paddle 115 in a fluid, the size of a string, wire, strand or other elongated object may be measured by the apparatus by the radial distance of the same from the center of shaft 114.

Instead of having paddle 115 on its lower end for entering a fluid to test the viscosity thereof, I may have a permanent magnet 175 which can be passed into close proximity to a metallic member 176 to determine the magnetic properties thereof.

When using a grooved wheel 120 for measuring the size of a wire or strand of yarn in a manufacturing process, for example, the strand or wire can be continuously passed through the groove while the apparatus is operating, and the larger the strand or wire is at a given point, the further out in the groove towards the periphery of wheel 120 will it be positioned, and this will increase the drag exerted on the rotation of the wheel, which will in turn increase the torsion in the torsion wire 59, and, of course, if places occur in the strand or wire which are of smaller diameter, the strand or wire will then occupy a position closer to the bottom of the groove and less torsion will be exerted by this frictional contact.

Secured on the lower surface of frame 10 is an insulation block 121 on which are secured metallic leaf spring contact brushes 122 and 123. These are adapted to press against the metallic rings 96 and 97 on the insulation block 95 at all times.

Secured on the upper surface of horizontal frame 10 is an inverted U-shaped strap member 124. On one leg of this strap member there is a bar 125 on which is secured solenoids 126 and 127. Pivotably mounted in and spanning the distance transversely between the vertical legs of inverted U-shaped member 124 is a cross rod 128, which has fixed thereon a member 129 projecting forwardly and rearwardly of rod 128 and to each end of this member 129 there is pivotally connected the upper ends of the slidable cores 130 and 131 of the solenoids 126 and 127. Also fixed on the transverse rod 128 is a lever 133, which has a balancing weight 134 at one end and has a fork comprising portions 135 and 136 at its other end which have slots 137 in their free ends fitting over the projections or pins 52 and 53 on the sleeve member 51.

Mounted on the top surface of inverted U-shaped member 124 is a supporting bar 140, which has mounted thereon, a pair of bearings 141 and 142 in which a rod 143 is rotatably mounted. This rod has a pair of ratchet wheels 144 and 145 fixed thereon which are adapted to be engaged by the forked ends of solenoid cores 146 and 147. These extend into solenoids 148 and 149 respectively and are normally pulled back to normal position by means of tension springs 150 and 151, having their ends secured to the solenoid shell and to the solenoid core. When the solenoids are energized the cores 146 and 147 are moved to engage the uppermost tooth in its associated ratchet wheel to rotate the shaft the amount of one tooth which operates an adding and subtracting counter 152, the purpose of which will be presently explained. It is to be observed that solenoid 148 will rotate the shaft 143 in one direction while solenoid 149 will rotate it in the opposite direction to add or subtract to the counter.

Figure 19:
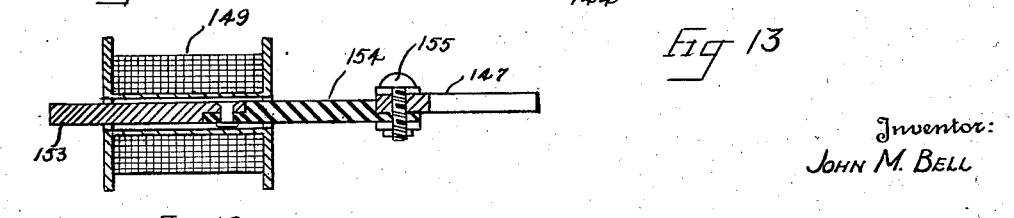
Figure 19 is a longitudinal sectional view through one of the counter solenoids.

The soft iron solenoid core 153 of each of the solenoids 148 and 149 has an insulation block or connector 154 riveted thereto and the forked member 146 or 147 are bolted thereto by bolt 155 (see Figure 19).

The wiring diagram

As previously stated, the current passes through wires 12 and 13 and through a switch 14 in the hot side of the line to the motor 15. To feed the solenoids a wire 160 is tapped off of the hot side 12 of the system and leads to one side of an electric light bulb socket 161 having an incandescent bulb 162 therein serving as a resistance. From the other side of the socket 161 a wire 163 is led to one side of solenoid 126.

A wire 164 leads from the other side of solenoid 126 to the uppermost leaf spring brush 122 shown in Figure 1. A hot wire 166 is tapped off of wire 163 and goes to one of the contact posts of solenoid 127 and wire 167 leads from the other contact post of solenoid 127 to the lowermost leaf spring member 123 mounted on insulation block 121 and shown in Figure 1.

At this point it is seen that the two wires can be grounded one at a time when one of the contacts on plate 107 may engage one of the contacts 100 or 101 on the insulation block 95 because the plate 107 is grounded to the framework of the machine. A wire 170 is tapped off of hot wire 163 and extends to one side of solenoid 148 and from the other side of solenoid 148 a wire 41 is connected to contact brush 38 in Figure 16.

A hot wire 171 is tapped off of hot wire 170 and leads to one side of solenoid 149, and wire 40 leads from the other side of solenoid 149 to the other metallic contact brush 39 in Figure 16.

Connected to the outer metallic band 33 (Fig. 6) on insulation block 31 is the wire 36, which as previously described, is connected to the leaf spring contact member 93 mounted on an insulation block 172 on the upper cage plate 46, which is adapted to be engaged by lever 84 when it is swung by contacting the cams or projections 90 and 91 to thereby ground the current and thus operate the counter in one direction, whereas wire 35 leads from the inner metallic ring 32 and is connected to metallic contact leaf spring 92 mounted on insulation block 173 on the upper cage plate 46 so that when lever 85 engages cams 90 and 91 while rotating, it will form a contact to move the counter back in the other direction.

Method of operation

In general, when the paddle 115 is disposed in a fluid for testing the viscosity of the same, or when the brush 117 is resting on a surface, the smoothness of which is to be tested, or the size of a strand is being tested in groove 120A, or when the magnetic properties of an article 176 are being tested by magnet 175, and switch 14 is moved to closed position, the motor 15 starts and this imparts rotation to the tube 25 and the cage thereon and this imparts torsion to the torsion wire 59 and through the torsion of this wire the lower tube 25A tends to be rotated and until sufficient torsion builds up in the wire to overcome the drag on the tool, depending upon the viscosity of the material being tested or the smoothness of the surface being tested, or broadly by the drag on the testing tool unit the torsion equals the drag on the tool, and the tool will begin to move. The underlying principle of the operation is the sensing of the torsion in wire 59 necessary to actuate the tool, and the employment of this manifestation either as an index to measurement or for the purpose of control.

If the drag on the tool is greater than the torsion in the wire, then the contact 100 mounted on the tube 25A will engage contact point 108 on the insulation block 95 mounted on the tube 25, and this will cause a current to flow through solenoid 127 by means of wires 160, 163, 166 and 167 to brush 123, which is in contact with the metallic ring 97 on the insulation block 95 mounted on the tube 25.

Metallic ring 97 is connected to contact point 100 on the insulation block, which being in contact with contact point 108 mounted on the disk 107 on tube 25A will ground the circuit to the framework of the machine and thus complete the circuit and solenoid 127 will be energized to lower the sleeve 51 on the tube 50, which will cause the projections 90 and 91 thereon to swing the lower lever 84 on the upper side of the cage plate 46 and this will cause the current to flow in impulses through wire 160, 170, 171, solenoid 149, wire 40, brush 39, wire 35, and contact 93 where the circuit is grounded, and this will advance the counter one step for each one half revolution of the tube 25 or twice upon each revolution as the two cams 90 and 91 will swing the lever 84 two times upon each revolution to convey impulses to the solenoid 149 to advance the counter. One or more projections may be used on one sleeve 51.

Each time the lever 84 is swung it will ratchet the worm shaft 61 one step at a time to move the worm wheel in the direction in which the cage is rotating to thus increase the torsion on the torsion wire 59. This moving step by step of the worm wheel will gradually increase the torsion in the torsion wire until the torsion in the wire equals the drag on the tool, at which time the contact point 108 on the lower tube 25A, will move away from the contact 100 on the insulation block 95 mounted on the lower end of the tube 25, to break the circuit to solenoid 127, and will allow the member 133 mounted on the transverse rod 128, to swing to neutral position.

This will allow the cam sleeve having the projections 90 and 91 thereon to swing to neutral position between the upper and lower levers 84 and 85 on the cage plate 46. This will continue until, for example, the viscosity of the material in the container becomes less or the liquid becomes thinner, or the surface over which the brush 117 is disposed will have become smoother or the drag on the testing tool lessens, and in which case there will not be as much resistance to the turning of the lower tube 25A by means of the torsion wire 59 and thus this will cause the contact 109 on block 107 mounted on the upper end of the lower tube 25A to engage contact point 101 on the insulation block 95 mounted on the lower end of tube 25, which will cause a current to flow through wires 160, 163, solenoid 126, wire 164, and down to upper brush 122, which is in contact with the metallic band 96 on the insulation block 95 mounted on the lower end of the tube 25 and will ground the circuit through contacts 101 and 109 to energize solenoid 126, which will swing the member 133 pivoted on transverse rod 128 upwardly at the forward end next to the cage and thus raise the cam sleeve 51 mounted on tube 50, which will cause the projections on the cam sleeve to be engaged by the upper lever 85 on the upper surface of cage plate 46, which will complete a circuit of two impulses each time the cage revolves through wires 160, 170, solenoid 148, wire 41, brush 38, metallic band 33, and wire 36, contact spring 92 and back to the other side of the circuit, which is the grounded frame and thus delivers two impulses for each revolution to move the counter 148 in a subtracting direction and the swinging of the lever will continue until the torsion has been lessened in the torsion wire to a point where it is the same as the drag on the tool, at which time the contacts 101 and 109 will move apart, and thus break the circuit through solenoid 126 and will cause the framework 129, mounted on rod 128, to swing to neutral position.

It is to be understood that this apparatus is to be employed for continuously testing the viscosity of a fluid, or the smoothness of the surface of an object, or the magnetic properties of a piece of metal.

Where the testing tool would be equipped with a magnet 175, as shown in Figure 20, this could be employed in many different fields such as, for example, in rolling mills where a sheet 176 would be continuously passed by the magnet 175 or it could be employed for testing the various properties of an object as to variations in magnetism or by moving the object relative to the magnet as, for example, in testing the hardness or softness of iron, steel and the like.

In the drawings and specification, there has been set forth a preferred embodiment of the invention, and although specific terms are employed, they are used in a generic and descriptive sense only and not for purposes of limitation, the scope of the invention being set forth in the appended claims.

I claim:

1. Apparatus for testing a substance comprising a torsion wire having a testing tool secured to one end thereof, a constant speed driving means secured to the other end of the wire for imparting rotation to the said other end of the wire, means controlled by the drag imparted to the testing tool for increasing the amount of torsion in the wire to a point where the resistance imparted to the testing tool by the substance being tested equals the torsion in the wire, and means for decreasing the amount of torsion in the wire when the testing tool encounters less resistance to rotation from the substance being tested.

2. Apparatus for testing an object comprising a torsion wire, a testing tool on one end of the wire adapted to test the object, means connected to the other end of the wire for imparting rotation to the wire and to the tool carried thereby, and follow-up mechanism on the driving means responsive to variations in the torsion in the wire for imparting further torsional movement to the wire, positive or negative, proportional to the resistance encountered by the tool.

3. Apparatus for testing comprising a torsion wire having a testing tool on one end thereof, a constant speed driving means connected to the other end of the wire for imparting rotation to said other end of the wire and the tool carried thereby, means controlled by the amount of resistance offered to the rotation of the tool for rotating the wire at a faster rate than it is driven by the driving means for increasing the torsion in the wire, and means also controlled by the amount of resistance offered to rotation of the tool for rotating the wire at a slower rate than it is being rotated by the driving means for decreasing the torsion in the wire.

4. Apparatus for testing an object comprising a rotatable member and means for imparting rotation to the rotatable member, a torsion wire having one end secured to the rotatable member and a testing tool secured to the other end of the torsion wire, means controlled by the amount of torsion in the wire and while the tool is testing an object for rotating the wire in one direction at a faster rate than the rotating means are rotating to increase the torsion in the wire until the resistance offered by the object being tested to the testing tool equals the torsion in the wire, and means also controlled by the resistance offered to the testing tool by the object for rotating the wire at a lesser rate than the rotatable member to lessen the torsion in the wire when the resistance offered by the substance to the rotation of the testing tool decreases.

5. Testing apparatus comprising a rotatable assembly, means for imparting rotation to the assembly, a torsion wire having one end thereof mounted in the assembly for rotation relative to the assembly, a testing tool secured to the other end of the wire for testing an object, means for imparting rotation to the assembly to impart rotation to the wire and the tool carried thereby, means carried by the assembly for imparting rotation to the wire relative to the rotation of the assembly and while the assembly is rotating, means fixed on the wire and controlling the means for imparting rotation to the wire relative to the assembly to rotate the wire at a faster rate until sufficient torsion is imparted to the wire to cause the resistance offered by the object being tested to the testing tool to equal the torsion imparted to the wire, and other means fixed to the wire for also controlling the means in the assembly for imparting rotation to the wire in a reverse direction relative to the assembly to decrease the torsion in the wire to where the torsion in the wire will counter-balance the resistance offered by the substance being tested to the testing tool.

6. Testing apparatus comprising a rotatable tube, a cage assembly fixedly mounted on the tube, means for imparting rotation to the tube and the cage member, a worm gear freely mounted on the tube and being adapted to rotate independently of the tube, a torsion member having its upper end fixedly secured to the worm gear and extending through the tube, a testing tool assembly fixedly secured on the other end of the torsion member and being restrained against rotation by the substance being tested, a pair of contacts fixed on the testing tool assembly, the testing tool assembly being grounded to the framework of the apparatus, a pair of contacts fixedly mounted on the tube to rotate therewith and insulated from the framework, a pair of movable members mounted in the cage assembly, a worm rotatably mounted in the cage assembly and meshing with the worm gear, means operable by the one of the movable members for moving the worm in one direction and means operable by the other movable member for moving the worm in the other direction, a sleeve member slidably mounted relative to the cage assembly and having a projection thereon, the two movable members in the cage assembly being at different levels relative to the projection on the sleeve and the projection on the sleeve being of such width that the movable members will pass above and below the projection when the sleeve is in normal position, electrical means for moving the sleeve member longitudinally of the axis of rotation of the cage assembly to cause one of the movable members to engage the projection to impart rotation to the worm in one direction to increase the torsion in the torsion member until the torsion in the torsion member equals the drag exerted on the testing tool by the substance being tested, at which time a contact point on the testing tool assembly will move away from a contact point on the tube to break the circuit to allow the sleeve to return to a normal position when the torsion in the wire equals the resistance offered to rotation of the testing tool assembly by the object being tested, a decrease in the resistance offered to rotation of the testing tool by the object being tested serving to establish a second circuit to move the sleeve in the other direction relative to the cage assembly to cause the projection thereon to be engaged by the other movable member to rotate the worm and worm wheel in the opposite direction to decrease the torsion in the torsion member until the torsion in the torsion member equals the resistance offered by the object being tested to rotation of the testing tool.

7. Apparatus for testing a substance as to viscosity, smoothness of surface, magnetic properties and the like, comprising a testing tool adapted to be influenced against rotation by an object being tested, a torsion member having one end thereof connected to the testing tool, constant speed means for imparting rotation to the other end of the torsion member, means controlled by the drag imparted to the testing tool and operable while the torsion member is rotating for increasing the rotation of said other end of the torsion member above the rate of rotation imparted by the constant speed means until the torsion in the torsion member equals the resistance offered to the rotation of the testing tool, and means also controlled by the drag imparted to the testing tool and operable while the torsion member and testing tool are rotating for decreasing the torsion in the torsion member when the resistance offered to rotation of the testing tool decreases, until the torsion in the torsion member equals the resistance offered to rotation of the testing tool.

8. Apparatus for testing the drag offered to a rotary testing tool by a material being tested comprising a torsion member having a testing tool secured on one end thereof, driving means connected to the other end of the torsion member for imparting rotation to the torsion member and the tool carried thereby, and a follow-up mechanism responsive to variations in the torsion of the wire for imparting a further torsional movement to the wire, positive or negative, proportional to the resistance encountered by the tool.

9. Apparatus for testing material to determine the amount of resistance offered to a tool rotating under the influence of the material being tested, comprising a constant speed electric motor, a sleeve driven by the motor, a torsion wire having one end supported by the sleeve and having a testing tool fixedly secured on the other end thereof, and electrical means controlled by the amount of drag offered to the rotation of the testing tool by the material being tested for increasing the rate of rotation of the torsion wire beyond that imparted by the motor until the torsion in the torsion wire equals the drag offered to rotation of the testing tool and for decreasing the rate of rotation of the wire below that imparted by the motor when the drag on the testing tool decreases until the torsion in the wire equals the drag exerted on the testing tool.

10. Apparatus for testing a substance comprising a torsion wire having a testing tool secured to one end thereof, constant speed means secured to the other end of the wire for imparting rotation to the wire, means for increasing the rate of rotation of the wire beyond that imparted by the constant speed means until the amount of torsion in the wire is increased to a point where the resistance imparted to the testing tool by the substance being tested equals the torsion in the wire, means for decreasing the speed of rotation of the wire below that imparted by the constant speed means when the testing tool encounters less resistance to rotation from the substance being tested, and means for indicating the amount the torsion in the wire is increased or decreased over a given period of time.

11. Apparatus for testing an object comprising a rotatable member and means for imparting rotation to the rotatable member, a torsion wire having one end secured to the rotatable member and a testing tool secured to the other end of the torsion wire, means controlled by the amount of torsion in the wire and while the tool is testing an object for rotating the wire in one direction at a faster rate than the rotating means are rotating to increase the torsion in the wire until the resistance offered by the object being tested to the testing tool equals the torsion in the wire, means also controlled by the resistance offered to the testing tool by the object for rotating the wire at a lesser rate than the rotatable member to lessen the torsion in the wire when the resistance offered by the substance to the rotation of the testing tool decreases, and means for indicating the amount the torsion in the wire is increased or decreased.

12. Testing apparatus comprising a rotatable assembly, means for imparting rotation to the assembly, a torsion wire having one end thereof mounted in the assembly for rotation relative to the assembly, a testing tool secured to the other end of the wire for testing an object, means for imparting rotation to the assembly to impart rotation to the wire and the tool carried thereby, means carried by the assembly for imparting rotation to the wire relative to the rotation of the assembly and while the assembly is rotating, means fixed on the wire and controlling the means for imparting rotation to the wire relative to the assembly to rotate the wire at a faster rate until sufficient torsion is imparted to the wire to cause the resistance offered by the object being tested to the testing tool to equal the torsion imparted to the wire, other means fixed to the wire for also controlling the means in the assembly for imparting rotation to the wire in a reverse direction relative to the assembly to decrease the torsion in the wire to where the torsion in the wire will counter-balance the resistance offered by the substance being tested to the testing tool, and means for indicating the amount the wire is rotated relative to the assembly.

13. Testing apparatus comprising a rotatable tube, a cage assembly fixedly mounted on the tube, means for imparting rotation to the tube and the cage member, a worm gear freely mounted on the tube and being adapted to rotate independently of the tube, a torsion member having its upper end fixedly secured to the worm gear and extending through the tube, a testing tool assembly fixedly secured on the other end of the torsion member and being restrained against rotation by the substance being tested, a pair of contacts fixed on the testing tool assembly, the testing tool assembly being grounded to the framework of the apparatus, a pair of contacts fixedly mounted on the tube to rotate therewith and insulated from the framework, a pair of movable members mounted in the cage assembly, a worm rotatably mounted in the cage assembly and meshing with the worm gear, means operable by the one of the movable members for moving the worm in one direction and means operable by the other movable member for moving the worm in the other direction, a sleeve member slidably mounted relative to the cage assembly and having a projection thereon, the two movable members in the cage assembly being at different levels relative to the projection on the sleeve and the projection on the sleeve being of such width that the movable members will pass above and below the projection when the sleeve is in normal position, electrical means for moving the sleeve member longitudinally of the axis of rotation of the cage assembly to cause one of the movable members to engage the projection to impart rotation to the worm in one direction to increase the torsion in the torsion member until the torsion in the torsion member equals the drag exerted on the testing tool by the substance being tested, at which time a contact point on the testing tool assembly will move away from a contact point on the tube to break the circuit to allow the sleeve to return to a normal position when the torsion in the wire equals the resistance offered to rotation of the testing tool assembly by the object being tested, a decrease in the resistance offered to rotation of the testing tool by the object being tested serving to establish a second circuit to move the sleeve in the other direction relative to the cage assembly to cause the projection thereon to be engaged by the other movable member to rotate the worm and worm wheel in the opposite direction to decrease the torsion in the torsion member until the torsion in the torsion member equals the resistance offered by the object being tested to rotation of the testing tool, a counter, and means controlled by one of the movable members for moving the counter in one direction when the movable member is moved and means controlled by the other movable member for moving the counter in the other direction when the movable member is moved.

14. Apparatus for testing a substance as to viscosity, smoothness of surface, magnetic properties and the like, comprising a testing tool adapted to be influenced against rotation by an object being tested, a torsion member connected to the testing tool, means for imparting rotation to the torsion member and the testing tool carried thereby, means operable while the torsion member is rotating for increasing the torsion in the torsion member until the torsion in the torsion member equals the resistance offered to the rotation of the testing tool, means also operable while the torsion member and testing tool are rotating for decreasing the torsion in the torsion member when the resistance offered to rotation of the testing tool decreases, until the torsion in the torsion member equals the resistance offered to rotation of the testing tool, and means for indicating the amount the torsion is increased in the wire and means for subtracting from that amount the amount the torsion is decreased in the wire.

15. Apparatus for testing the drag offered to a rotary testing tool by a material being tested comprising a torsion member having a testing tool secured on one end thereof, constant speed driving means connected to the other end of the torsion member for imparting rotation to the torsion member and the tool carried thereby, means operable while the torsion member is rotating for increasing the torsion in the torsion member until the torsion therein equals the drag offered by the material to rotation of the testing tool, means for decreasing the torsion in the torsion member when the drag on the testing tool decreases until the torsion in the torsion member equals the drag being exerted on the testing tool, and means operable by the means for increasing the torsion for indicating the amount the torsion is increased and means operable by the means for decreasing the torsion for subtracting from the first named amount the amount the torsion is decreased.

16. Apparatus for testing the drag offered to a rotary testing tool by a material being tested comprising a torsion member having a testing tool mounted on one end thereof, constant speed driving means connected to the other end of the torsion member, means automatically operable by the amount of drag exerted on the testing tool by the material being tested for maintaining a constant relation between the drag offered to the testing tool by the material being tested and the amount of torsion in the torsion member, and means for indicating the amount of variation in the torsion over a given period.

17. Apparatus for testing material to determine the amount of resistance offered to a tool rotating under the influence of the material being tested, comprising a constant speed electric motor, a sleeve driven by the motor, a torsion wire having one end supported by the sleeve and having a testing tool fixedly secured on the other end thereof, electrical means controlled by the amount of drag offered to the rotation of the testing tool by the material being tested for increasing the torsion in the torsion wire until the torsion in the torsion wire equals the drag offered to rotation of the testing tool and for decreasing the torsion in the wire when the drag on the testing tool decreases until the torsion in the wire equals the drag exerted on the testing tool, and means for indicating the amount the torsion has been increased and means for subtracting from said amount the amount the torsion has been decreased.

JOHN M. BELL.